United States Patent [19]

Kühnlein et al.

[11] Patent Number: 4,531,843
[45] Date of Patent: Jul. 30, 1985

[54] CALORIMETER

[75] Inventors: Hans Kühnlein, Nurnberg-Grossgrundlach; Reinhard Stark, Nuremberg, both of Fed. Rep. of Germany

[73] Assignee: Siemens Aktiengesellschaft, Munich, Fed. Rep. of Germany

[21] Appl. No.: 470,478

[22] Filed: Feb. 28, 1983

[30] Foreign Application Priority Data

Mar. 9, 1982 [DE] Fed. Rep. of Germany ....... 3208511

[51] Int. Cl.$^3$ ............................................. G01K 17/06
[52] U.S. Cl. ...................................... 374/40; 374/41; 374/39
[58] Field of Search ...................... 374/31, 37, 39, 40, 374/41, 42

[56] References Cited

U.S. PATENT DOCUMENTS

| 4,048,852 | 9/1977 | Sakakibara et al. | 374/41 |
| 4,224,825 | 9/1980 | Fellen | 374/41 |
| 4,244,216 | 1/1981 | Dukelon | 374/39 |
| 4,412,647 | 11/1983 | Lampert | 374/39 |
| 4,437,771 | 3/1984 | Cazzaniga | 374/39 |

FOREIGN PATENT DOCUMENTS 2068128  8/1981  United Kingdom ................. 374/41

Primary Examiner—Charles Frankfort
Assistant Examiner—David R. Schuster
Attorney, Agent, or Firm—Scully, Scott, Murphy & Presser

[57] ABSTRACT

A calorimeter for the measurement of a quantity of heat given up by a fluidic medium in at least one heat exchanger, with an impellerless flow velocity measuring device as well as temperature sensors for determining the forward flow-return flow temperature difference, including a multiplier for forming the product from the flow velocity and the forward flow-return flow temperature difference; and also a quantizer for the formation of a pulse train having a frequency which is proportional to the product, as well as a cumulative counting device for the pulses of the pulse train connected to the output thereof. The flow velocity measuring device is activated only at predetermined points in time or moments, whereby the frequency of these measuring moments is determined approximately proportional to an auxiliary variable which represents a measure for the importance of a possible change in a parameter determining the heating quantities on the measured result, and in which a second multiplier is connected ahead of the quantizer which the output signal of the first multiplier is multiplied with a value proportional to the timewise interval between two measurement switching moments.

9 Claims, 1 Drawing Figure

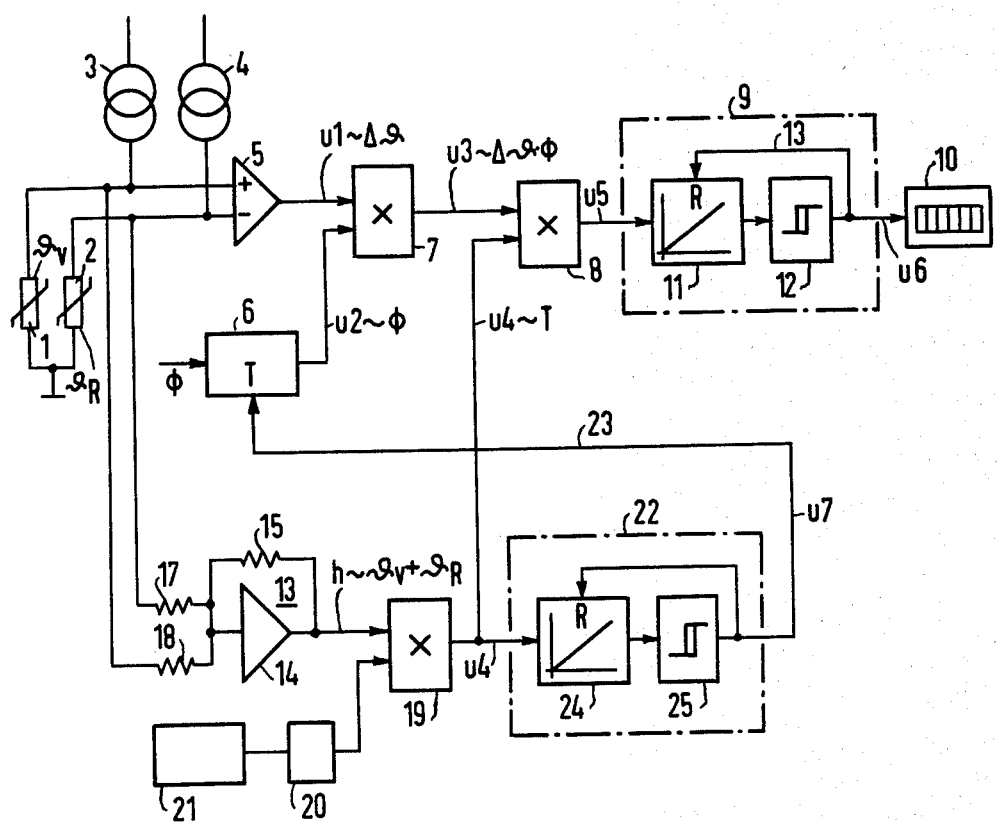

CALORIMETER

BACKGROUND OF THE INVENTION

1. Field of the Invention

The present invention relates to a calorimeter for the measurement of a quantity of heat given up by a fluidic medium in at least one heat exchanger, with an impellerless flow velocity measuring device as well as temperature sensors for determining the forward flow-return flow temperature difference, including a multiplier for forming the product from the flow velocity and the forward flow-return flow temperature difference; and also a quantizer for the formation of a pulse train having a frequency which is proportional to the product, as well as a cumulative counting device for the pulses of the pulse train connected to the output thereof.

2. Discussion of the Prior Art

Mechanical flow velocity measuring devices are frequently utilized in commercially available calorimeters for determining the flow velocity, for example impeller-type anemometers, which withdraw the energy required for the measuring process from the kinetic energy of the flowing fluidic medium. Such mechanical flow velocity measuring devices evidence a series of disadvantages. Thus, they frequently fail to start up at low flow velocities because of bearing friction, so that the obtention of a measured value becomes impossible. Moreover, such mechanical flow velocity measuring devices are subject to corrosion and require a constructional volume and extensive demands with regard to manufacturing and assembling. Non-mechanical flow velocity measuring devices are in existence which are not burdened with these disadvantages. However, these are generally not in a position to withdraw the energy required for the measuring sequence from the kinetic energy of the fluidic medium. In contrast therewith, they require a supply of electrical energy. Such non-mechanical flow velocity measuring devices are, for example, based on acoustic flow-through measuring methods, magnetically inductive measuring methods, or thermal measuring methods. These measuring methods are described in greater detail, for example, in the journal "Technisches Messen tm" 1979, Volume 4, Pages 145, 146 and 148.

Inasmuch as calorimetric counters must be constructed so as to be tamperproof, and should be operated without requiring connection to a power supply in order to reduce the complexity of the installation, they are usually supplied with power from a battery which is arranged in a sealed housing. At high energy use, a frequent battery change is required.

SUMMARY OF THE INVENTION

Accordingly, it is an object of the present invention to provide an improved calorimeter of the above-mentioned type wherein, notwithstanding the utilization of non-mechanical flow velocity measuring devices, there can readily be reduced the consumption of electrical energy.

The foregoing object is inventively achieved in that the flow velocity measuring device is activated only at predetermined points in time or moments, whereby the frequency of these measuring moments is determined approximately proportional to an auxiliary variable which represents a measure as to the significance of a possible change in a parameter determining the heating quantities on the measured result, and in which a second multiplier is connected ahead of the quantizer in which the output signal of the first multiplier is multiplied with a value proportional to the timewise interval between two measurement switching moments.

Hereby, in that the flow velocity measuring device is no longer in continual operation, but is activated only at predetermined measuring moments for the effectuation of a measurement, electrical energy is required only during the measuring moments and for the constant duration of a measurement by the flow velocity measuring device. Accordingly, the electrical energy source of the calorimeter is extensively unburdened in comparison with a calorimeter incorporating a flow velocity measuring device which is continually in operation. When the flow velocity measuring device is presently activated at measuring moments which are separated by constant time interval, there must then be selected such a high frequency for these measuring moments that even the most rapidly possible changes in the heating efficiency can still be determined. Since such rapid changes in the heating quantity occur only relatively seldom, a calorimeter of that kind would be oversized for the commonly encountered, comparatively slow changes in the heating efficiency or output with respect to the frequency of the measuring moments, so as to always still necessitate a comparatively high consumption of electrical energy for the operation of the flow velocity measuring device.

The present invention is based on the recognition that a further unburdening of the electrical energy source of the calorimeter can be achieved when the frequency of the measuring moments is not constant, but must only be high when there can be expected changes of at least one parameter determining the heating quantity which are relevant to the measured results of the flow velocity measuring device, in contrast with which the frequency of the measuring moments can then be low when no such changes can be expected in a parameter determining the heating efficiency relevant to the measured result. The frequency of the measuring moments is rendered dependent upon the value of an auxiliary variable. Thus, for example, the frequency of the measuring moments can be selected approximately proportional to the timewise gradient of the forward flow temperature. When this gradient is high, which is always the case when the forward flow temperature changes extensively, the given up temperature quantity varies considerably, so that in order to avoid errors in the measured results in the calorimeter, the flow measuring device must be frequently placed in operation. The auxiliary variable and the frequency of the measuring moments will then also assume an increased value when, for example, a regulated circulating pump which influences the flow velocity, is activated in a heating system in correspondence with the required heat quantity. This high value of the auxiliary variable leads also in this case to a high frequency of measuring moments. Since for a precise measurement result of the calorimeter there must also be considered the heat quantity given up between the measuring moments, and these measuring moments are separated from each other by different time intervals, a second multiplier is connected ahead of the quantizer of the calorimeter, in which the output signal of the first multiplier which is proportional to the heat quantity is multiplied with a value proportional to the timewise interval to the subsequent measuring moment which is determined through the value of the auxiliary variable. Precluded hereby are errors in the measured result of the calorimeter through the varying frequency of the measuring moments.

Serving as the auxiliary variable can a generally heat quantity-proportional signal. As such a signal there can serve the median value from the forward flow and return flow temperature. Since a lower instantaneously given up heat quantity contributes comparatively little to the given up overall heat quantity determined by the calorimeter, in this instance, without significantly influencing the measured results, there can be taken into consideration the lower frequency of the measuring moments which are correlated with the lower value of the auxiliary variable. At a higher instantaneously given up heat quantity, the auxiliary variable rises and, consequently, also the frequency of the measuring moments for the flow velocity measuring device.

For this case there is provided a summing device for the output signals of the temperature sensors which are associated with the heating forward flow and the heating return flow, whose output signal serves as the auxiliary variable. Inasmuch as, for the operation of a calorimeter, there must in any event be provided temperature sensors for the heating forward flow and the heating return flow, the auxiliary variable can be obtained with only minor technical requirements.

A preferred embodiment consists of in that the output signal of the summing device is transmitted, on the one hand, to a further quantizer for the formation of a pulse train with a frequency proportional to the magnitude of the output signal of the summing device and, on the other hand, to the second input of the second multiplier, whose first input is connected with the output of the first multiplier, and wherein the pulse train is transmitted to the trigger input of the flow velocity measuring device. Hereby, the auxiliary variable, which is proportional to the output signal of the summing device is converted into a pulse train whose frequency is proportional to the auxiliary variable. Each pulse of the pulse train activates the triggerably constructed flow velocity measuring device so as to effectuate a flow velocity measurement. The flow velocity-proportional output signal of the flow velocity measuring device, together with the forward-rearward flowing temperature difference is joined in the first multiplier into a signal which is proportional to the actual heat quantity. Moreover, the output signal of the summing device, which is employed as the auxiliary variable, is transmitted into a second multiplier which is connected to the output of the first multiplier for consideration of the generally different time intervals between two measuring moments. This signifies, with respect to the economical availability of multipliers and quantizers which are available as integrated modules, only a small additional requirement.

The summing device can have an operational element acting as a juncture connected directly to the output thereof, whose one input has the output signal of the summing device transmitted thereto, and whose other input has the output signal of a random generator transmitted thereto, wherein the random generator includes an upper bounded data supply. Serving as the operational element can be a third multiplier or a further summing device. For a third multiplier which operates on an analog basis, or a further summing device functioning in this manner, it is necessary that the output signal of the random generator which is usually available in a digital mode be analogized prior to processing in the multiplier. This, however, is not necessary when there is employed as the random generator a noise generator, since the output signal thereof occurs as an analog magnitude. This random generator brings an incalculable displacement of the measuring moments into play, so that even when the measuring moments determined solely due to the auxiliary variable are known to an operator of the calorimeter who is tampering therewith, it would render impossible manipulation of the calorimeter.

Each quantizer can be constituted of an integrator, as well as a threshold stage which is connected thereto, whose output forms the output of the quantizer, wherein the output signal of the threshold stage is used for the resetting of the integrator. Thereby, in an economical manner, a pulse train can be tapped off at the output of the quantizer, and whose frequency is proportional to the input signal.

BRIEF DESCRIPTION OF THE DRAWING

Reference may now be had to the following detailed description of an exemplary embodiment of the invention, taken in conjunction with the single figure of the drawing showing a circuit block diagram of the inventive calorimeter.

DETAILED DESCRIPTION

The calorimeter illustrated in the single figure of the drawing includes two temperature-sensitive resistors 1 and 2, in which the first one serves for determining the forward flow temperature $\sigma_V$, and the other the determination of the return flow temperature $\sigma_R$. In the event that through the calorimeter there is merely to be determined the heat quantity given up by a heat exchanger, then both temperature-sensitive resistors 1 and 2 are to brought into direct thermal contact with the heating forward flow and heating return flow of this heat exchanger. In contrast therewith, if by means of the calorimeter there is to be determined the heat quantity which is given up through a large number of heat exchangers within a building unit, then the temperature-sensitive resistors 1 and 2 are to brought into thermal contact with the forward flow and return flow collector conduit. The temperature-sensitive resistor 1 is supplied from a constant-current source 3, the temperature-sensitive resistor 2 from a constant current source 4. The voltage dropoffs which occur at the temperature sensitive resistors 1 and 2, and which are proportional to the forward flow temperature $\sigma_v$ or, respectively, the return flow temperature $\sigma_r$ are transmitted to the + and − inputs of a differential data former 5, whose output signal u1 is proportional to the forward flow-return flow temperature difference $\Delta\sigma = \sigma_v - \sigma_R$.

In lieu of the temperature sensitive resistors 1 and 2 there can also be utilized thermal elements whereby, in this instance, the constant-current sources 3 and 4 are obviated.

For the determination of the flow velocity of the heat-transporting fluidic medium there serves a flow velocity measuring device 6 which is introduced in the heating forward flow and, respectively, heating return flow conduit, which is adapted to be activated by a pulse-shaped signal occurring at the trigger input T for a short term measuring procedure. The output signal u2 of the flow velocity measuring device 6, which is proportional to the flow velocity appears at one input of a multiplier 7, whose second input receives the signal u1 which is proportional to the forward-return flow temperature difference of $\Delta\sigma$. The multiplier 7 delivers at its output a signal u3 which is proportional to the product of the forward-return flow temperature difference $\Delta\sigma$ and the flow velocity $\phi$, which corresponds to the heat quantity given up at the actual measuring moment.

This signal u3 is present at one input of a second multiplier 8, to other input of which there is transmitted a signal u4 determining the frequency of the measuring moments of the flow velocity measuring arrangement 6. This signal u4 serves for the consideration of the differently long time intervals between individual measuring moments during the determination of the measured results of the calorimeter.

The heat quantity Q which is to be determined by the calorimeter can be mathematically represented as $$Q = \sum_n T_n \cdot \phi_n \cdot \Delta\theta_n,$$

wherein $T_n$ corresponds to the time span proportional to the inverse of the frequency of the measuring moments between the commencement of two measuring moments for the nth measuring moment, $\Delta\sigma_n$ corresponds to the flow velocity measured at the nth measuring moment. $\Delta\sigma_n$ corresponds to the forward-return flow temperature difference present at the nth measuring moment. Thereby, the output signal u5 of the multiplier 8 corresponds to a summing element $T_n \times \phi_n \times \Delta\sigma_n$. The signal u5 is transmitted to the quantizer 9, which delivers a pulse train u6 at its output, whose frequency is proportional to the magnitude of the input signal u5. The output signal u6 of the quantizer 9 supplies a cummulative count mechanism 10 in which there are added the pulses of the pulse train. The content of the cummulating count mechanism 10 represents the entire heat quantity heretofore determined by the calorimeter, and thus contains the measured results of the calorimeter.

The quantizer 9 includes an integrator 11 at its input whose output signal is transmitted to a threshold stage 12, whose output forms the output of the quantizer. The output signal of the threshold stage 12 is transmitted through the conductor 13 to the reset input of the integrator 11. Such quantizers are well known from the technology relating to electronic electric meters.

For the determination of the measuring moments at which the flow velocity measuring device 6 is present activated for a short period over a constant time span, there serves an auxiliary variable h. This auxiliary variable h represents a measure over the importance of a possible change of at least one parameter determining the instantaneous heat quantity for the measured results of the calorimeter. In the case of the embodiment illustrated in the single figure of the drawing, serving as the auxiliary variable h is a somewhat heat output-proportional signal, for which there is selected as the simply recoverable approximated value, the median value from the forward and rearward flow temperature $(\sigma_V = \sigma_R)/2$. Since the forward flow temperature $\sigma_V$ and the return flow temperature. and the return flow temperature $\sigma_R$ are anyway determined within the context of a calorimeter, the mentioned sum is easily determined without an additional energy demand. This occurs by means of the summing device 13. The summing device 12 consists of an operational amplifier 14 with a return conductor 16 containing an ohmic resistor 15. Transmitted through the summing resistors 17 and 18 are the voltages, which drop off at the temperature-sensitive resistors 1 and 2, to the input of the operational amplifier 14. The output signal of the operational amplifier 14 represents the auxiliary variable $h = \sigma_V + \sigma_R$, which is proportional to the median heat exchanger temperature $(\sigma_V + \sigma_R)/2$.

This auxiliary variable h is transmitted to the input of a third multiplier 19 which serves as an operational element effecting a juncture of its two input signals, whose second input is subjected with the output signal of a random generator 21 analogized by the digital-analog transducer 20. In lieu of the third multiplier 19, it is also possible to undertake an additive juncture of the two input signals through a further summing device. The random generator 21 includes an upwardly bounded data call. As random generator there can also be used a noise generator, through the utilization which there can be eliminated the analog-digital transducer 20. As the output signal u4 of the third multiplier 19 there now appears a signal which determines the time span between individual measuring moments. Hereby the auxiliary variable h is also modulated in a stochastic or random manner so that an exact prediction over the measuring moments of the flow velocity measurement device 6 is no longer possible. Through the employment of the random generator 21 is thus achieved a high degree of manipulative safety against tampering attempts with the measured results of the calorimeter.

For the instance in which no high demands of that type are set on the manipulative safety, the random generator 21, the digital-analog transducer 20, as well as the multiplier 19 can be eliminated. In this case, the auxiliary variable h can be directly transmitted as a signal u4 to one input of the second multiplier and, additionally, to the input of the further quantizer 22. However, for the embodiment illustrated in the figure of the drawing, there is utilized the output signal of the third multiplier 19 as the signal u4. In the quantizer 22, which is connected to the output of the third multiplier 19, the output signal u4 determining time span between the individual measuring moments is converted into a pulse train u7 whose frequency is proportional to the value of the signal u4. The pulses of the pulse train u7 are transmitted through the conductor 23 to the trigger input T of the flow velocity measuring device 6. A measuring moment is determined through each pulse of the pulse train u7, at which the flow velocity measuring device 6 is activated for a presently constant time span. As the result of each such measuring sequence, there is formed at the output of the flow velocity measuring device 6, a signal u2 which is proportional to the flow velocity $\phi$.

The further quantizer 22 is constructed in the same manner as the previously mentioned quantizer 9. It includes, at the input side thereof, an integrator 24 as well as a threshold stage 25 connected to the output thereof, whose output forms the output of the quantizer 22. The output signal of the threshold stage 25 is conducted to the reset input R of the integrator 24.

Conceivable as the auxiliary variable which determines the measuring moments, in a modification of the embodiment illustrated in the drawing, are a series of further variables. Thus, for example, for the formation of this auxiliary variable h, in lieu of the summing device 13, there can serve a differentiating element, to the input of which there is conducted the voltage dropoff at the temperature-sensitive resistor 1 for the determination of the forward flow temperature. Alternatively, the auxiliary variable h can also be tapped off from the setting signal of a circulating pump which is regulated in dependence upon the heat requirements. Hereby, it is merely important that upon a change of a parameter which determines the actual heat output, there is increased the frequency of the measuring timepoints.

What is claimed is:

1. In a calorimeter for the measurement of the heat quantity given up by a fluidic medium in at least one heat exchanger, including an acoustic flow velocity measuring device, and temperature sensors for the determination of the forward-return flow temperature difference, a multiplier for the formation of the product of the flow velocity and the forward-return flow temperature difference, a quantizer for forming a pulse train at a frequency proportional to the product, and a cumulating counting device connected to the output of the quantizer for the pulses of the pulse train; the improvement comprising in that the flow velocity measuring device is activated only at predetermined measuring moments wherein the frequency of these measuring moments is generally proportional to an auxiliary variable representative of a measure for the significance of a possible change of at least one parameter determining the heat output on the measured result, said parameter being chosen from the group consisting of a generally heat output-proportional signal and a signal proportional to the time-wise gradient of the forward flow temperature, and a second multiplier connected to the input of the quantizer in which the output signal of the first multiplier is multiplied with a value proportional to the timewise spacing between two measuring moments.

2. Calorimeter as claimed in claim 1, said auxiliary variable comprising a generally heat outputproportional signal.

3. Calorimeter as claimed in claim 2, comprising a summing arrangement for the output signals of the temperature sensors associated with the heat forward flow and heat return flow, the output signal of said summing device forming the auxiliary variable.

4. Calorimeter as claimed in claim 3, comprising a further quantizer receiving the output signal of the summing device forming a pulse train with a frequency proportional to the magnitude at the output signal of the summing device and being connected with the second input of the second multiplier, wherein the first input of the second multiplier is connected with the output of the first multiplier, the pulse train being conducted to a trigger input of the flow velocity measuring device.

5. Calorimeter as claimed in claim 3, an operational element being directly connected to the output of the summing device so as to form a juncture, said operational element having one input for receiving the output signal of the summing device and a second input for receiving the output signal of a random generator, said random generator including an upwardly bounded data storage.

6. Calorimeter as claimed in claim 5, said operational element comprising a third multiplier.

7. Calorimeter as claimed in claim 5, said operational element comprising a further summing device.

8. Calorimeter as claimed in claim 5, said random generator comprising a noise generator.

9. Calorimeter as claimed in claim 4, each said quantizer comprising an integrator and a threshold stage connected to the output thereof, the output of which forms the output of the first quantizer and wherein the output signal of the threshold stage provides for resetting of the integrator.

* * * * *